United States Patent
Murugesan et al.

(10) Patent No.: US 10,560,394 B2
(45) Date of Patent: Feb. 11, 2020

(54) DYNAMIC TRANSMISSION SIDE SCALING

(71) Applicant: CISCO TECHNOLOGY, INC., San Jose, CA (US)

(72) Inventors: Prasannakumar Murugesan, San Ramon, CA (US); Ajeet Pal Singh Gill, Fremont, CA (US); David A. Johnson, Nashua, NH (US); Ian McDowell Campbell, Littleton, CO (US); Ravinandan Arakali, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

(21) Appl. No.: 15/713,230

(22) Filed: Sep. 22, 2017

(65) Prior Publication Data

US 2019/0097939 A1    Mar. 28, 2019

(51) Int. Cl.
| | |
|---|---|
| *H04L 12/863* | (2013.01) |
| *H04L 12/935* | (2013.01) |
| *H04W 28/02* | (2009.01) |
| *H04L 12/26* | (2006.01) |
| *H04L 12/24* | (2006.01) |

(52) U.S. Cl.
CPC ...... *H04L 47/6255* (2013.01); *H04L 43/0888* (2013.01); *H04L 49/3063* (2013.01); *H04W 28/0231* (2013.01); *H04L 41/20* (2013.01)

(58) Field of Classification Search
CPC ............. H04L 47/6255; H04L 43/0888; H04L 49/3063; H04L 41/20; H04W 28/0231
See application file for complete search history.

(56) References Cited

U.S. PATENT DOCUMENTS

| 7,865,895 B2 * | 1/2011 | Anand ................... G06F 9/5033 |
| | | 711/118 |
| 7,979,507 B2 | 7/2011 | Vasudevan et al. |
| 8,170,042 B2 | 5/2012 | Mukherjee |
| 8,954,968 B1 * | 2/2015 | Pohl ..................... G06F 11/3409 |
| | | 718/100 |
| 9,445,284 B2 | 9/2016 | Bontu et al. |
| 2003/0005263 A1 * | 1/2003 | Eickemeyer .......... G06F 9/3802 |
| | | 712/218 |
| 2010/0161945 A1 * | 6/2010 | Burky ................... G06F 9/3834 |
| | | 712/215 |
| 2011/0320555 A1 * | 12/2011 | Qiu ........................ H04L 63/08 |
| | | 709/207 |

(Continued)

FOREIGN PATENT DOCUMENTS

WO    WO2010117359 A1    10/2010

*Primary Examiner* — Ivan O Latorre
(74) *Attorney, Agent, or Firm* — Cindy Kaplan (57) ABSTRACT

In one embodiment, a method includes assigning a number of threads for user plane functions to a corresponding number of transmit queues for transmission of packets on a network interface, assigning additional threads exceeding the number of transmit queues to software transmission queues associated with the threads assigned to the transmit queues, identifying a load at each of the threads, dynamically updating assignment of the additional threads to the software transmission queues based on the load at the threads, and transmitting packets from the transmit queues for transmission on a network from a physical interface at a network device. An apparatus and logic are also disclosed herein.

20 Claims, 4 Drawing Sheets

(56) References Cited

U.S. PATENT DOCUMENTS

| | | | | |
|---|---|---|---|---|
| 2012/0066688 | A1* | 3/2012 | Chiang | G06F 9/5083 |
| | | | | 718/105 |
| 2013/0305009 | A1* | 11/2013 | Durant | G06F 9/5016 |
| | | | | 711/170 |
| 2014/0019982 | A1* | 1/2014 | John | G06F 9/544 |
| | | | | 718/102 |
| 2014/0040903 | A1* | 2/2014 | Hsu | G06F 9/5027 |
| | | | | 718/103 |
| 2014/0223437 | A1* | 8/2014 | Chang | G06F 9/4881 |
| | | | | 718/102 |
| 2014/0355439 | A1* | 12/2014 | Kakadia | H04L 47/522 |
| | | | | 370/235 |
| 2015/0100965 | A1* | 4/2015 | Tran | G06F 9/5011 |
| | | | | 718/103 |
| 2015/0244804 | A1* | 8/2015 | Warfield | H04L 47/6295 |
| | | | | 709/219 |
| 2016/0012083 | A1* | 1/2016 | Mottupalli | G06F 17/30321 |
| | | | | 707/634 |
| 2016/0350173 | A1* | 12/2016 | Ahad | G06F 11/3495 |
| 2016/0378545 | A1* | 12/2016 | Ho | G06F 9/50 |
| | | | | 718/107 |
| 2018/0069793 | A1* | 3/2018 | Narayanan | H04L 45/72 |
| 2018/0285174 | A1* | 10/2018 | Che | G06F 9/546 |
| 2019/0236749 | A1* | 8/2019 | Gould | G06F 9/4881 |

* cited by examiner

DYNAMIC TRANSMISSION SIDE SCALING

TECHNICAL FIELD

The present disclosure relates generally to communications networks, and more particularly, to transmission side processing in a communications network.

BACKGROUND

In networks such as next generation mobile core networks, a user plane needs to have very high throughput. Conventional scheduling and queuing of outgoing network packets may not efficiently utilize available hardware resources or scale as needed in high throughput networks.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises assigning a number of threads for user plane functions to a corresponding number of transmit queues for transmission of packets on a network interface, assigning additional threads exceeding the number of transmit queues to software transmission queues associated with the threads assigned to the transmit queues, identifying a load at each of the threads, dynamically updating assignment of the additional threads to the software transmission queues based on the load at the threads, and transmitting packets from the transmit queues for transmission on a network from a physical interface at a network device.

In another embodiment, an apparatus generally comprises a plurality of transmit queues associated with a network interface, a plurality of threads for user plane functions, a number of the threads exceeding a number of the transmit queues, a processor for assigning a portion of the threads to a corresponding number of the transmit queues, assigning remaining threads to software transmission queues associated with the threads assigned to the transmit queues, identifying a load at each of the threads, and dynamically updating assignment of the threads to the software transmission queues based on the load at the threads, memory for storing a mapping of the threads to the software transmission queues, and a physical interface for transmitting packets from the transmit queues to a network.

In another embodiment, logic is encoded on one or more non-transitory computer readable media for execution and when executed operable to assign a number of threads for user plane functions to a corresponding number of transmit queues for transmission of packets on a network interface, assign a plurality of additional threads exceeding the number of transmit queues to software transmission queues associated with the threads assigned to the transmit queues, identify a load at each of the threads assigned to the transmit queues, dynamically update assignment of the additional threads to the software transmission queues based on the load at the threads, and transmit packets from the transmit queues for transmission on a network from a physical interface at a network device.

Further understanding of the features and advantages of the embodiments described herein may be realized by reference to the remaining portions of the specification and attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

With transmission side scheduling and queueing in conventional systems, such as OVS DPDK (Open vSwitch with Data Plane Development Kit) and similar systems, there is a limitation with respect to binding cores to transmit queues on a Network Interface Card (NIC). In 5G next generation mobile cores, for example, a user plane needs to be capable of very high throughput and efficiently use available hardware resources. In conventional systems, a sending application may, for example, try to write directly onto an interface on a single queue or use spinlocks to synchronize transmission. These conventional systems, which typically assign cores to transmit functions in a static manner, do not scale based on increase in core size or load, thus limiting performance in a high throughput network. Transmission of packets inefficiently may cause tail-drops/queue-drops on the interfaces, which can result in lower end-to-end NDR (Non-Drop Rate) throughput for user plane applications.

The embodiments described herein provide transmission side scaling using dynamically allocated processing resources. One or more embodiments may reduce tail drop and improve the NDR for network functions such as user plane forwarding. Transmit side batching may also be used to increase user plane throughput in paravirtualized networks. Use of transmit side scaling by distributing cores across queues helps to scale the transmit side throughput, as described in detail below.

The embodiments operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network) and may operate in a cloud environment. The cloud may comprise, for example, a Virtual Private Cloud (VPC) comprising an on-demand configurable pool of shared computing resources allocated within a public cloud environment. Cloud computing enables network access to a shared pool of configurable resources that can be rapidly provisioned and released with minimal management effort.

Figure 1:
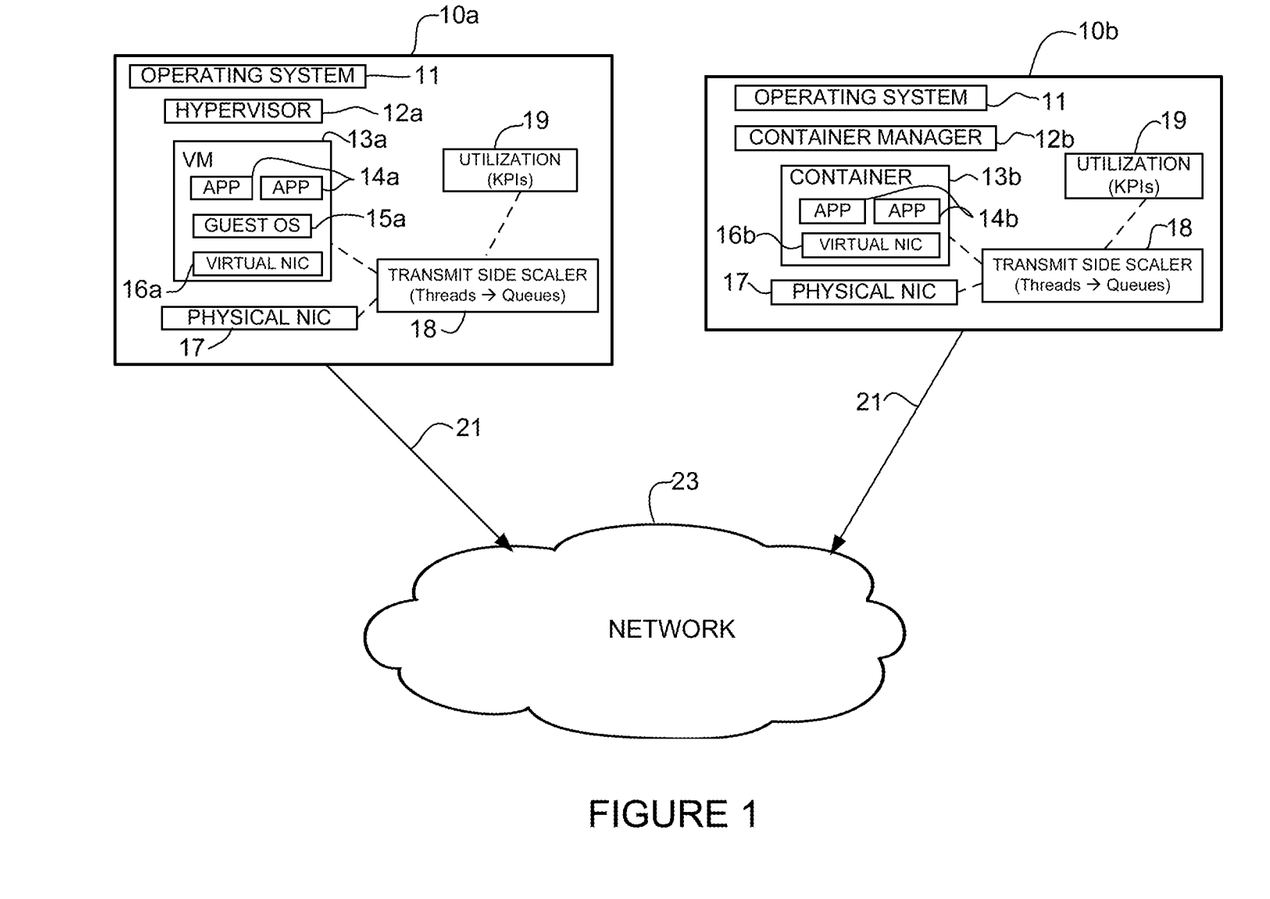
FIG. 1 illustrates an example of a network in which embodiments described herein may be implemented.

Referring now to the drawings, and first to FIG. 1, an example of a network in which embodiments described herein may be implemented is shown. For simplification, only a small number of nodes (network devices) are shown. The network device may comprise any processing system (e.g., computer system, server system) or a virtualization platform and may comprise virtualized or non-virtualized applications.

As shown in the example of FIG. 1, the network device may include one or more virtual machines (node 10a) or containers (node 10b). Network device 10a includes a host operating system 11 and a virtual machine manager (e.g., hypervisor) 12a. In one example, the network device 10a comprises a plurality of virtual machines 13a. The network device 10a may comprise any number of virtual machines 13a and one or more applications (e.g., user applications) 14a may be associated with each virtual machine. As shown in the example of FIG. 1, the virtual machine 13a includes an instance of a guest operating system 15a and at least one virtual Network Interface Card (vNIC) 16a. Virtual applications 14a may execute as virtual machines 13a using a hypervisor 12a as shown for node 10a or as containers 13b using a container engine 12b, as shown for node 10b.

The network device 10b includes a host operating system 11 and a container manager 12b. The network device 10b further comprises one or more containers 13b comprising applications 14b and at least one virtual NIC 16b. The network devices 10a, 10b may comprise any number of virtual machines 13a or containers 13b, respectively, or may operate in a dedicated metal (bare metal, single VM/container) deployment, which uses a single tenant server (i.e., one tenant application per host).

One of the resources used by virtualized applications 14a, 14b running in a cloud environment is virtual network interface 16a, 16b for receiving and transmitting packets. Each network device 10a, 10b further includes one or more physical network interfaces 17 for transmission of packets from the user applications 14a, 14b to a network 23 via communications links 21.

The embodiments described herein may be used, for example, in 5G mobile core and other packet core services (e.g., 4G, 3G, Wi-Fi, small cell networks). In one or more embodiments network functions are provided as virtualized services. For example, network interfaces together with the operating system may provide various techniques such as SRIOV (Single Root I/O Virtualization) or pass-through of devices to virtual applications, with multiple queues for receiving and transmitting packets. In one example, the system includes a Virtualized Packet Core (VPC) that runs VPC services on an instance of a virtual machine. The system may operate, for example, on an Ultra Services Platform, available from Cisco Systems, Inc. It is to be understood that this is only an example and that other platforms, services, or cores may be used, without departing from the scope of the embodiments.

A transmit side scaler 18 is provided to perform transmit side scaling at the virtual interface 16a, 16b or physical interface 17. The transmit side scaler 18 performs transmit side processing, which refers to the processing of outgoing information packets received from applications 14a, 14b for subsequent transmission as network packets over network connections 21 to network 23. Outgoing packets may comprise, for example, application data received from user applications 14a, 14b and may be associated with a process running on one of a plurality of processing cores. Each processing core (e.g., CPU) may support more than one user application 14a, 14b and an operating system to hardware interface may be provided between the processing cores and transmit side scaling element. As described in detail below, the transmit side scaler 18 binds packet processing cores (threads) to transmit queues on the virtual or physical network interface cards. In one or more embodiments, the transmit side scaler 18 may dynamically assign threads to transmission queues based on utilization (load, Key Performance Indicators (KPIs)) 19, which may be stored in memory at the network device 10a, 10b or another location (e.g., controller, management device (not shown)). The term "thread" as used herein may refer to a packet processing core or any other processing resource. The term "load" as used herein may refer to any performance indicator identifying utilization or performance.

It is to be understood that the network devices and topology shown in FIG. 1 and described above is only an example and the embodiments described herein may be implemented in networks comprising different network topologies or network devices, or processes or protocols, without departing from the scope of the embodiments. For example, the network device may be in communication with any number of sources or receivers in one or more networks. The network may include any number or type of network devices that facilitate passage of data over the network (e.g., routers, switches, gateways, controllers, appliances), network elements that operate as endpoints or hosts (e.g., servers, virtual machines, containers, clients), and any number of network sites or domains in communication with any number of networks. Thus, network nodes may be used in any suitable network topology, which may include any number of servers, virtual machines, containers, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
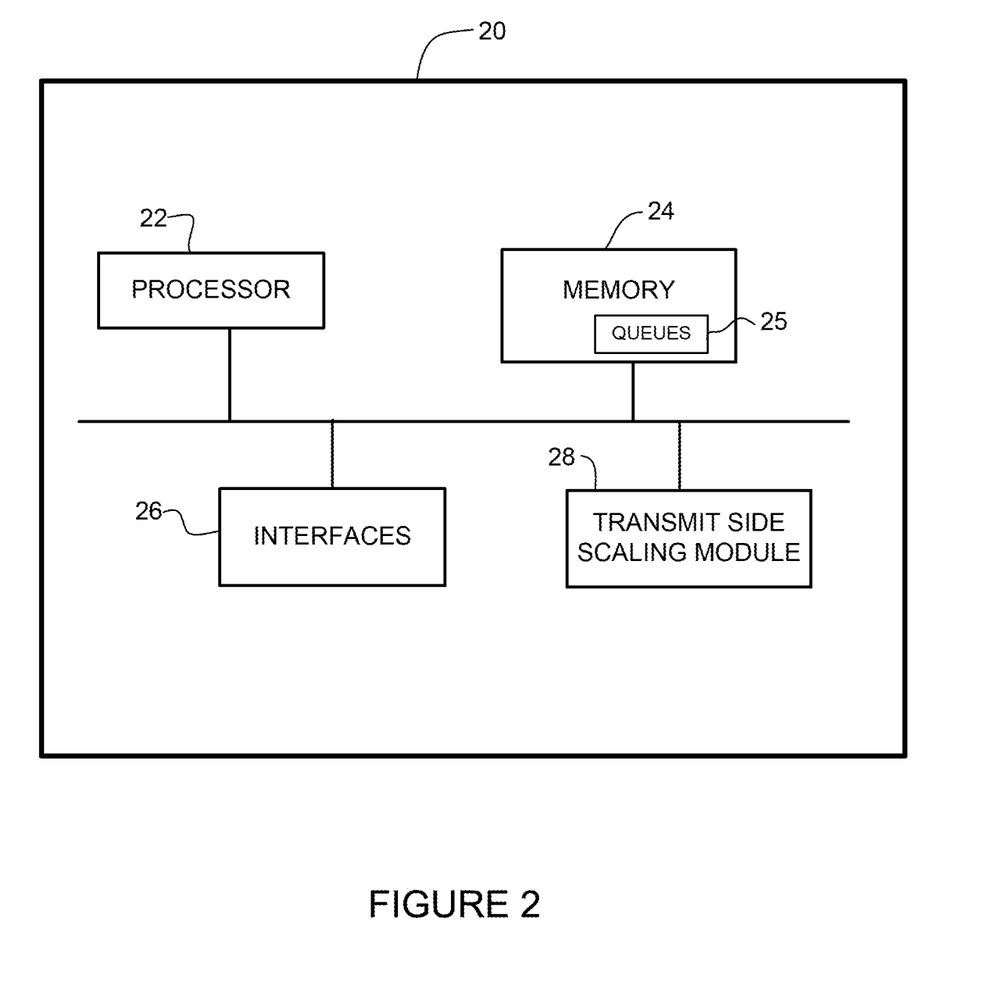
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented in hardware, software, or any combination thereof. The network device 20 includes one or more processor 22, memory 24, network interfaces 26, and transmit side scaling module 28.

Memory 24 may be a volatile memory or non-volatile storage, which stores various applications, operating systems, modules, and data for execution and use by the processor 22. Memory 24 may store one or more components (e.g., logic, software, code, firmware) for the transmit side scaling module 28. Transmit queues 25 may comprise portions of memory and may be stored, for example, in transmit queue memory. The device 20 may include any number of memory components.

The network device 20 may include any number of processors 22 (e.g., single or multi-processor computing device or system), which may communicate with a forwarding engine or packet forwarder operable to process a packet or packet header. The processor 22 may receive instructions from a software application or module, which causes the processor to perform functions of one or more embodiments described herein.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The logic may be operable to perform one or more steps shown in the flowchart of FIG. 3.

The network interfaces 26 may comprise any number of interfaces (virtual interfaces, physical interfaces, line cards, ports) for receiving data or transmitting data to other devices. For example, the network device 20 may comprise one or more virtual interfaces configured for transmission side scaling and one or more physical interfaces for transmitting the packet from the network device to the network. In one example, the network device 20 comprises a virtual host-user NIC exposed through a virtual switch between the application and the hardware. The physical network interface may include, for example, an Ethernet interface for connection to a network. The network interfaces 26 may be configured to transmit or receive data using a variety of different communication protocols and may include mechanical, electrical, and signaling circuitry for communicating data over physical links coupled to the network. For example, line cards may include port processors and port processor controllers.

The transmit side scaling module 28 may comprise, for example, logic, code, software, firmware, or other components, modules, or devices for performing processes described below with respect to FIG. 3. One or more components of the transmit side scaling module 28 may be stored in memory, including for example, key performance indicators (e.g., load indicators) used to dynamically assign cores (threads) to transmit queues.

It is to be understood that the network device 20 shown in FIG. 2 and described above is only an example and that different configurations of network devices may be used. For example, the network device may further include any suitable combination of hardware, software, processors, devices, components, or elements operable to facilitate the capabilities described herein.

Figure 3:
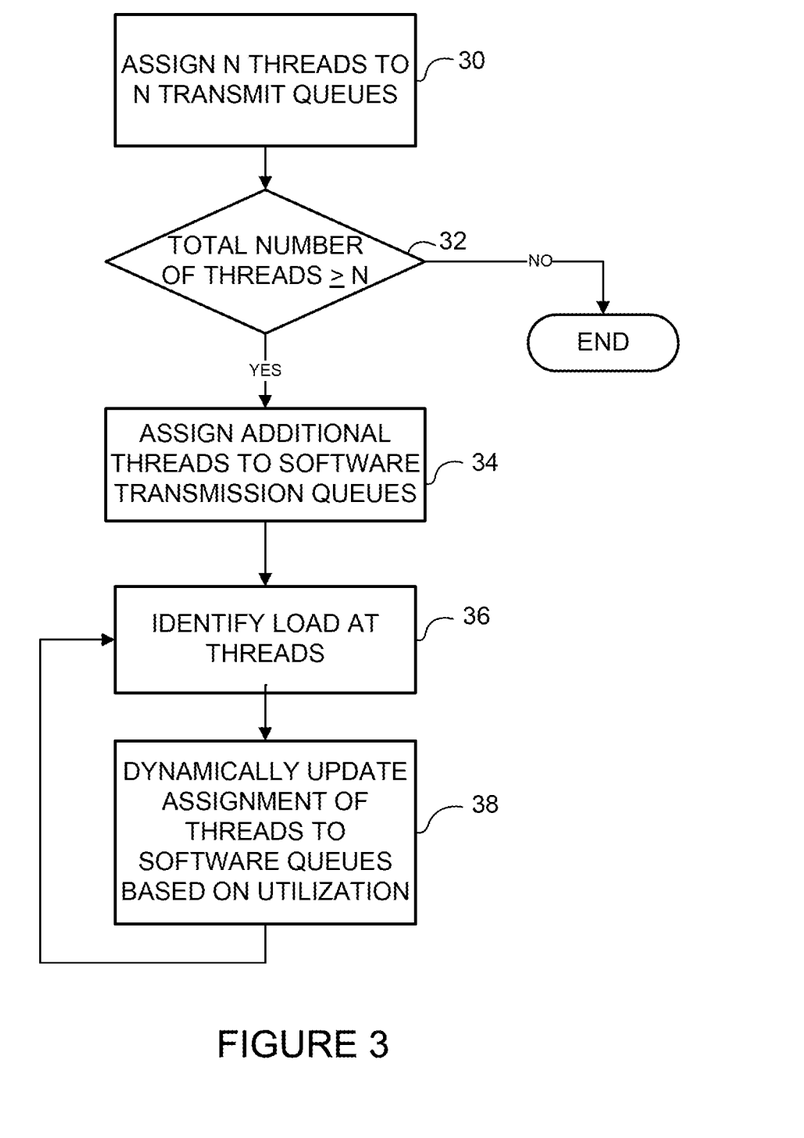
FIG. 3 is a flowchart illustrating an overview of a process for dynamic transmission side scaling, in accordance with one embodiment.

FIG. 3 is a flowchart illustrating an overview of a process for transmit side scaling, in accordance with one embodiment. Outgoing packets are received from applications and the proper transmit queue for the outgoing packet is either identified or assigned and packets bound for a specified NIC are enqueued. At step 30, a number of threads (packet processing cores) for user plane functions are assigned to a corresponding number of transmit queues for transmission of packets on a network interface. If a NIC has multiple transmission queues greater than or equal to the number of threads (T≤N), a core is dynamically bound to a transmission queue. If the total number of threads exceeds the total number of transmit queues (step 32), these additional threads are assigned to software transmission queues associated with the threads assigned to the transmit queues (step 34). Each thread maintains a KPI for its load (e.g., cycles spent in transmission function, cycles spent in overall user plane functions running in the context of threads, etc.) (step 36). Assignment of the additional threads to software transmission queues is dynamically updated based on the load at the threads (step 38). The load at the threads may be monitored and assignment of threads may be periodically updated based on changes in load. The packets are stored in the proper transmit queue prior to being sent out over a network connection at a physical interface by the operating system.

It is to be understood that the process shown in FIG. 3, and described above is only an example and that steps may be added, modified, combined, removed, or reordered, without departing from the scope of the embodiments.

Figure 4:
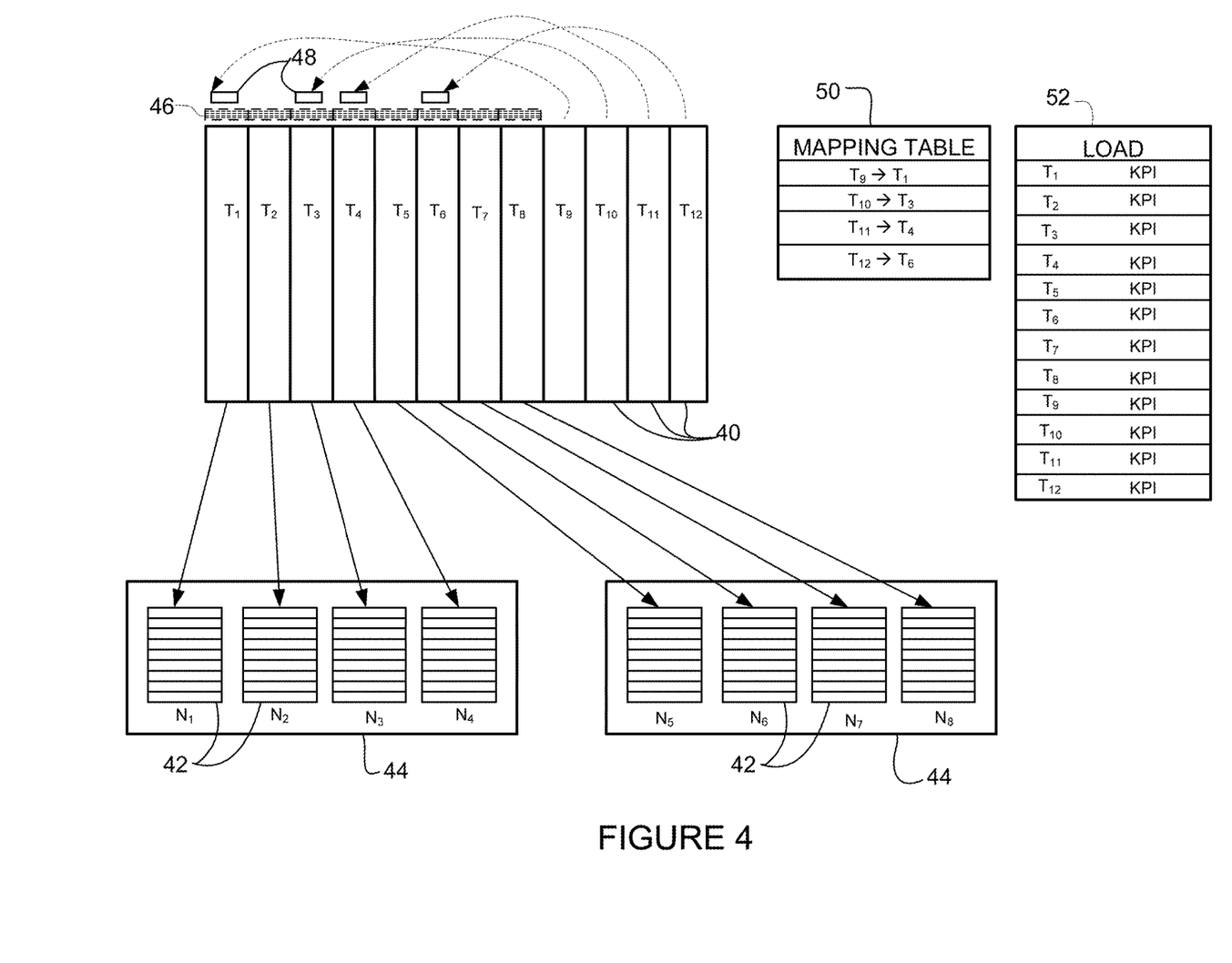
FIG. 4 is a diagram illustrating transmission side scaling, in accordance with one embodiment.

FIG. 4 illustrates an example of dynamic transmission side scaling in accordance with one embodiment. In this example, there are twelve threads 40 ($T_1$-$T_{12}$) (processing resources, execution cores, packet cores, packet processing cores, processes scheduled on different cores, threads with software transmission, queue servicing thread) for user plane functions and eight available queue resources 42 ($N_1$-$N_8$) for network interfaces (one or more NICs 44). In this example, the number of threads (T) running the applications outnumbers the transmission queues (N) per port, as is often the case. As shown in FIG. 4, threads $T_1$-$T_8$ are assigned to queues $N_1$-$N_8$, respectively, for transmission on an interface. The remaining four (T-N) threads are assigned to software transmission queues 46, each uniquely associated with one of the threads ($T_1$-$T_8$) assigned directly to the transmit queues. In this example, the software queues 46 are shown for $T_1$-$T_8$, but all threads may have software transmission queues associated therewith. In the example shown in FIG. 4, packets 48 from thread $T_9$ are transmitted to queue $N_1$, which is the transmit queue $T_1$ is assigned. Mappings between threads shown at table 50 may be generated by a monitor/scheduler thread, for example.

Each thread 40 may also maintain utilization (e.g., KPI) for its load as shown at table 52. For example, each thread may maintain the cycles it spent in transmission functions and cycles spent in overall user plane functions running in the context of the threads. Other KPIs such as packet drops in software queues, utilization of queues, utilization of CPU cycles, or other performance indicators may be used to load balance data over the queues. This allows for software transmission traffic to be distributed across N threads rather than a single thread. The map at table 52 may be dynamically updated based on load changes at periodic intervals, which may be configurable, for example. The thread may select the destination thread assigned to a transmit queue based on the mapping and send the packet 48 to the associated software transmission queue 46. In one or more embodiments, assignment of the original N threads to the N queues may also be updated based on utilization to further load balance the traffic over the N queues.

In one embodiment, assignment of threads 40 to transmit queues 42 or T-N threads to software queues 46 may be performed based on a hash function. In hash function based implementation, packets from one specific thread are channeled through a fixed thread among the N threads. The hash function or a round robin process may be used, for example, to initially assign the T-N threads to the software queues and then assignments may be dynamically updated based on the actual load.

In one or more embodiments, a lockless, single writer, single reader queue is used to avoid any contention.

The following describes one embodiment that may be used to prevent out of order packet processing when switching queues. In one example, each software queue has an admin state, which is either Enabled or Disabled. As previously noted, queues may be software queues or hardware queues. Each thread has a software queue to all other threads, however, out of these software queues only a few may be active based on the load/scheduler decision. The software queues towards the threads that have active hardware queue are mostly the candidates to be enabled. Initially, each thread that does not have a hardware queue is allocated to send packets to one of the hardware queue owner threads. Only the corresponding software queue is active. Once a decision is made to switch the packets towards a different hardware queue thread, the software queue towards the current hardware queue thread from the packet generating thread is stopped. Once the thread is stopped, the current hardware thread stops servicing this queue. The current packet generating thread at the same time flushes the packets in this queue to a different software queue (towards a new selected hardware queue thread), before putting any new packets on that queue. This allows the packet order to be maintained. The new destination hardware thread starts servicing the packets from the current software thread at that point onwards.

As can be observed from the foregoing, the embodiments described herein provide numerous advantages. For example, transmit side scaling by distributing cores across queues helps to scale the transmit side throughput. One or more embodiments may improve the overall NDR (Non-Drop Rate) performance of the network functions. One or more embodiments may also provide better resource utilization as compared to conventional spinlock based implementations, which provide static queue assignment. In one or more embodiments, batching of packets on the transmit side avoids making system calls (VM exit) in the case of paravirtualized NICs.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
assigning a number of threads for user plane functions to a corresponding number of transmit queues for transmission of packets on a network interface;
assigning a plurality of additional threads exceeding the number of transmit queues to software transmission queues associated with the threads assigned to the transmit queues;
identifying a load at each of the threads assigned to the transmit queues;
dynamically updating assignment of said additional threads to said software transmission queues based on the load at the threads; and
transmitting packets from the transmit queues for transmission on a network from a physical interface at a network device.

2. The method of claim 1 wherein the network interface comprises a virtual network interface card.

3. The method of claim 1 wherein each of the threads and said additional threads corresponds to a mobile packet processing core.

4. The method of claim 1 wherein identifying the load comprises identifying key performance indicators.

5. The method of claim 1 wherein identifying the load comprises identifying cycles spent in user plane functions running in the threads.

6. The method of claim 1 wherein assigning each of said plurality of additional threads further comprises initially assigning each of said additional threads to one of the software transmission queues based on a hash function.

7. The method of claim 1 further comprising generating a mapping of said additional threads to said software transmission queues and dynamically updating said mapping.

8. An apparatus comprising:
a plurality of transmit queues associated with a network interface;
a plurality of threads for user plane functions, a number of said threads exceeding a number of the transmit queues;
a processor for assigning a portion of said plurality of threads to a corresponding number of transmit queues, assigning remaining threads to software transmission queues associated with the threads assigned to the transmit queues, identifying a load at each of the threads, and dynamically updating assignment of the threads to said software transmission queues based on the load at the threads;
memory for storing a mapping of the threads to said software transmission queues; and
a physical interface for transmitting packets from the transmit queues to a network.

9. The apparatus of claim 8 wherein the network interface comprises a virtual network interface card.

10. The apparatus of claim 8 wherein each of the threads corresponds to a mobile packet processing core.

11. The apparatus of claim 8 wherein the load is based on key performance indicators.

12. The apparatus of claim 8 wherein the load is based at least in part on cycles spent in user plane functions running in the threads.

13. The apparatus of claim 8 wherein the threads are initially assigned to the software transmission queues using a hash function.

14. The apparatus of claim 8 wherein the processor is configured to periodically update the mapping based on changes in the load.

15. Non-transitory computer readable media for execution and when executed operable to:
assign a number of threads for user plane functions to a corresponding number of transmit queues for transmission of packets on a network interface;
assign a plurality of additional threads exceeding the number of transmit queues to software transmission queues associated with the threads assigned to the transmit queues;
identify a load at each of the threads assigned to the transmit queues;
dynamically update assignment of said additional threads to said software transmission queues based on the load at the threads; and
transmit packets from the transmit queues for transmission on a network from a physical interface at a network device.

16. The non-transitory computer readable media of claim 15 wherein the network interface comprises a virtual network interface card.

17. The non-transitory computer readable media of claim 15 wherein each of the threads corresponds to a mobile packet processing core.

18. The non-transitory computer readable media of claim 15 wherein the load is based on key performance indicators.

19. The non-transitory computer readable media of claim 15 wherein the load is based at least in part on cycles spent in transmission functions.

20. The non-transitory computer readable media of claim 15 wherein the threads are initially assigned to said software transmission queues based on a hash function.

* * * * *